United States Patent [19]

Zack

[11] Patent Number: 4,730,117

[45] Date of Patent: Mar. 8, 1988

[54] CASH BOX IDENTIFICATION SYSTEM

[75] Inventor: Larry E. Zack, Cary, Ill.

[73] Assignee: General Signal Corporation, Stamford, Conn.

[21] Appl. No.: 915,192

[22] Filed: Oct. 3, 1986

[51] Int. Cl.[4] .......... G01N 9/04

[52] U.S. Cl. .......... 250/568; 340/570

[58] Field of Search .......... 250/222.1, 566, 568; 340/569, 570; 364/401, 405, 406

[56] References Cited

U.S. PATENT DOCUMENTS

| | | | |
|---|---|---|---|
| 4,454,414 | 6/1984 | Benton | 364/406 |
| 4,636,634 | 1/1987 | Harper et al. | 250/568 |

*Primary Examiner*—Edward P. Westin
*Assistant Examiner*—Khaled Shami
*Attorney, Agent, or Firm*—Joseph P. Abate; John F. Ohlandt

[57] ABSTRACT

An identification system for guaranteeing that a cash box adapted to receive revenue from an associated fare box is delivered to an authorized location; the system includes a transmitter as part of the cash box for generating a coded series of pulses uniquely identifying the particular cash box; a receiver is included as part of the fare box for receiving that coded series of pulses; a microcomputer connected to the output of the receiver reads and decodes the coded series of pulses to provide the identification number for the particular cash box; the microcomputer also stores the cash box number in its memory; further provided is an arrangement for selectively varying the coded series of pulses so as to uniquely identify each of a group of cash boxes.

6 Claims, 6 Drawing Figures

CASH BOX IDENTIFICATION SYSTEM

BACKGROUND OF THE INVENTION

1. Field of the Invention

The present invention relates generally to a system for collecting and temporarily storing the revenue deposited by transit bus passengers or the like. The fares deposited in a fare box are temporarily stored in a locked box, which receives the revenue from the fare box and is commonly referred to as a cash box or a till.

2. Background Information

In the past there has been no way, other than by constant supervision by a trusted supervisor, to guarantee that the cash box and its revenue are delivered to a duly authorized location. There have been known systems in which a cash box has been inserted into the apparatus on which a fare box is mounted, such systems involving the use of infrared transmission, and also involving a mirror placed on the cash box such that unless the cash box is in the correct place the fare box will not be rendered operative. However, such systems have proved to be unsatisfactory from the security standpoint. That is to say, that there is no guarantee, as noted above, when the cash box containing the revenue has been separated from the fare box, that it was delivered to the proper authorized location and the revenue properly transferred to suitable receiving equipment.

Accordingly, it is a primary object of the present invention to provide a system to allow the fare box, or a piece of ancillary equipment, to determine the presence and identification number of any properly equipped cash box inserted into an associated fare box or ancillary equipment.

Another object is to enhance the security of the revenue contained in the cash box by allowing the continuous monitoring or "tracking" of the cash box from one piece of equipment to another.

SUMMARY OF THE INVENTION

In fulfillment of the above and other objects of the invention a primary feature of the present invention lies in the provision which enables complete tracking of the cash box by reason of identifying, at the outset, the particular cash box that has been inserted into a particular fare box, and by continously monitoring of both the fare box and the authorized revenue collection point or location in respect of the particular cash box so that certainty is achieved as to whether or not that particular cash box has had its contents properly transferred. This continous monitoring operation is accomplished by means of a central station computer which is linked to the fare boxes in the transportation network and to the authorized collection locations.

Although a central station or system computer has been utilized in obtaining certain information from a given fare box, such as the amount of money put into the fare box and the like, there has been no complete facility for guaranteeing proper delivery of the associated cash box.

Broadly stated, the system of the present invention guarantees proper delivery of cash boxes to an authorized station, the system comprising a fare box and apparatus on which said fair box is mounted; a cash box and a compartment within said apparatus for receiving the cash box so as to place it in proximity to the fare box for receiving revenue from the fare box; a transmitter included as part of said fare box for generating a coded series of pulses uniquely identifying the cash box; a receiver included as part of said fare box for receiving that coded series of pulses; and a microcomputer connected to the output of said receiver for reading and decoding said coded series pulses so as to properly identify the cash box; the computer storing that identification number for the particular cash box involved.

Other and further object, advantages and features of the present invention will be understood by reference to the following specification in conjunction with the annexed drawing, wherein like parts have been given like numbers.

PREFERRED EMBODIMENT OF THE INVENTION

Figure 1:
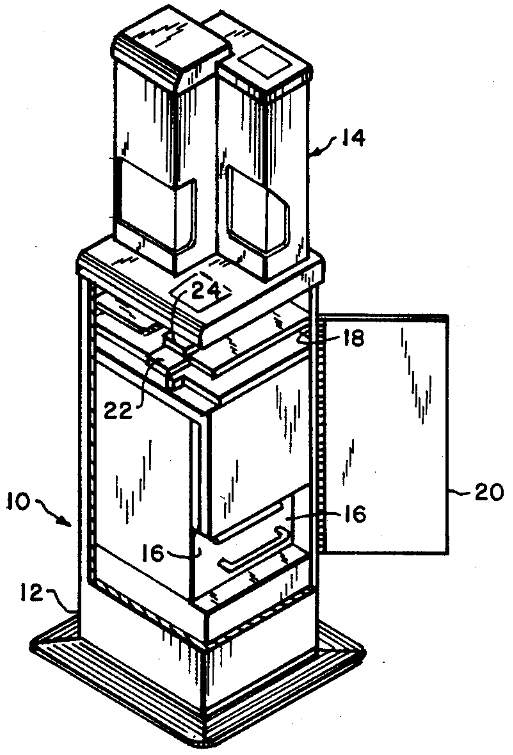
FIG. 1 is a partly broken away, perspective view of a fare box mounted on a conventional piece of apparatus, and a cash box inserted in a compartment provided in that apparatus.

Referring now to the Figures of the drawing and particularly for the moment to FIG. 1, there will be seen in this Figure the physical relationship among the several parts of the system. What is involved is basically an apparatus 10 including a pedestal 12 on which a dual port fare box 14 is mounted. Situated beneath the fare box is a cash box 16 which is received in a compartment 18 within the pedestal 12, access to the compartment being gained by lockable door 20. Thus when revenue is to be transferred from the fare box 14 into the cash box 16, the cash box, by suitable security measures, is inserted by a duly authorized person into the compartment 18. Initially, when the cash box 16 is inserted into the compartment, the infrared output from the transmitter to be described is received by the receiver and, as a consequence, the fare box becomes operational only when the cash box has been properly inserted.

The unique aspect of the system of the present invention resides in the provision of a transmitter 22 mounted in the upper part of the cash box 16 and adapted to put out a coded series of pulses. This series of pulses is received by a receiver 24 contained in the fare box portion of the system.

The present system provides identification in tracking of the cash box 16 by reason of the fact that the transmitter 22 transmits for a given cash box a unique series of coded pulses and it is the storage in the fare box of this unique series of pulses, representative of a decimal number or the like, that enables the data system at a central location to determine that a particular cash box has received a particular amount of revenue from a particular fare box. Accordingly, it is guaranteed that the delivery to an authorized station of the correct amount of revenue will be realized.

Figure 2A:
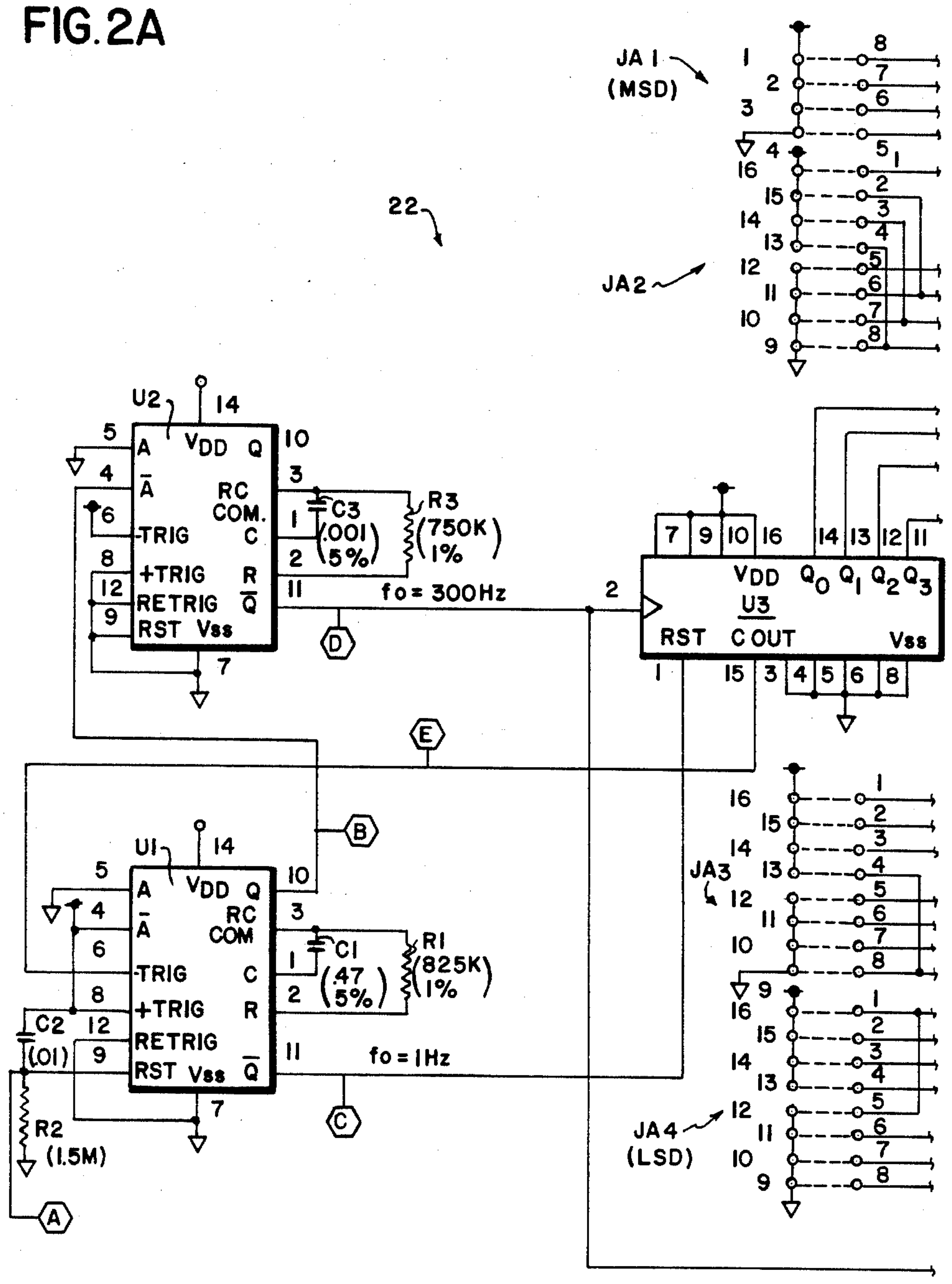
FIGS. 2A and 2B are schematic diagrams of the transmitter circuitry found in the cash box of the system of the present invention.
Figure 2B:
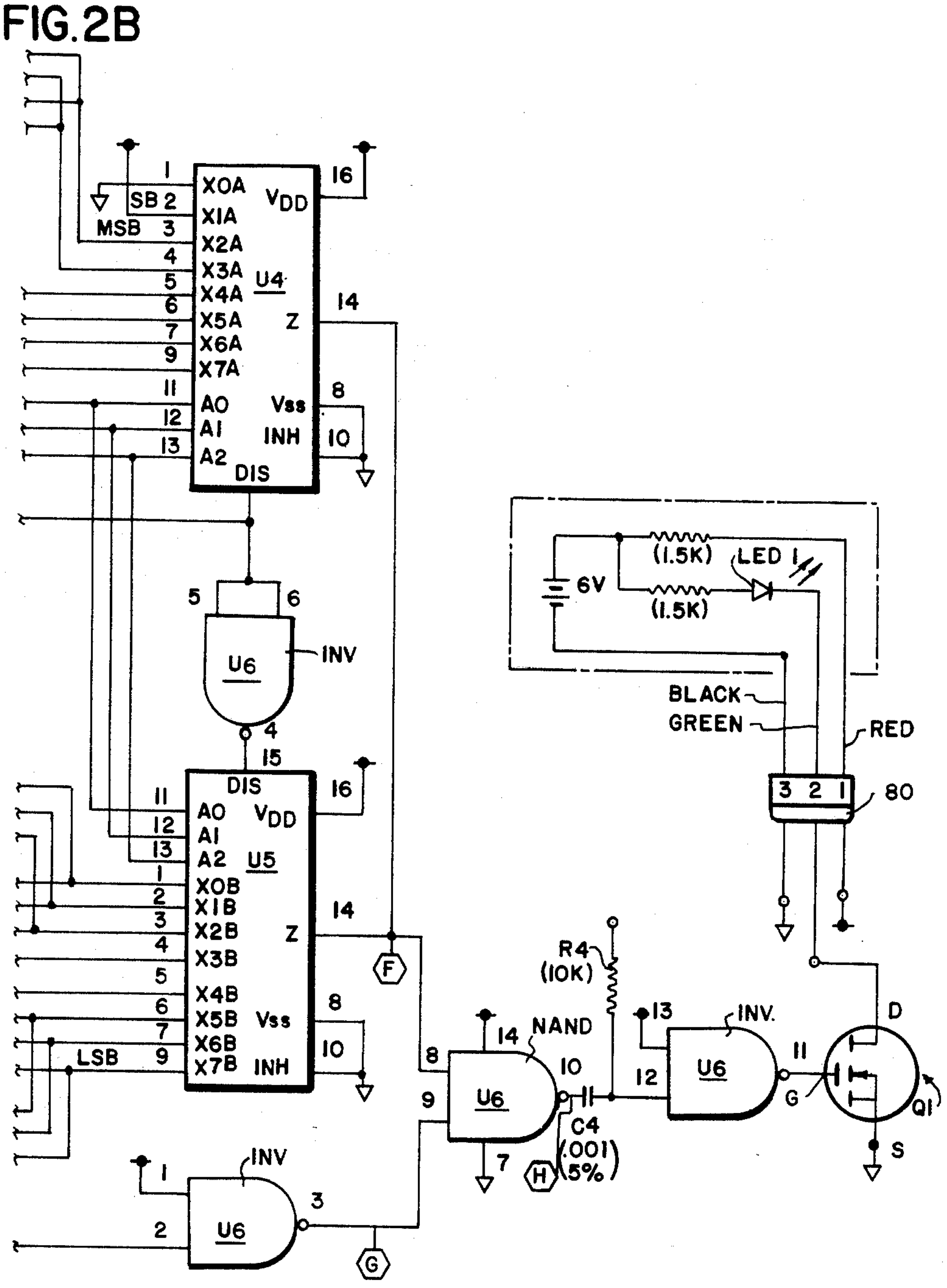
Figure 3:
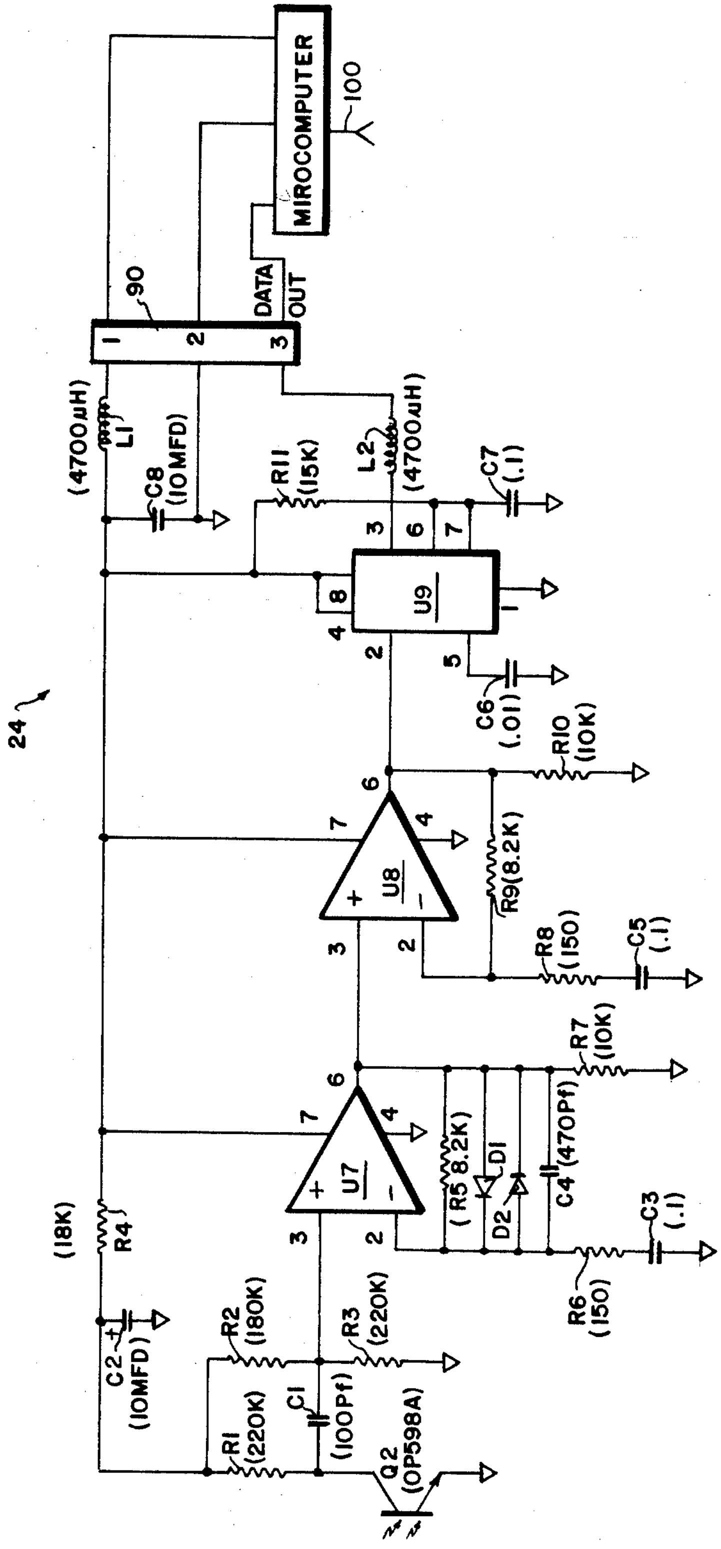
FIG. 3 is a schematic diagram of the receiver circuitry found in the fare box portion of the system.

In FIG. 2 of the drawing there is depicted, in schematic form, the circuitry of the transmitter device 22 for generating a coded series of pulses identifying the particular cash box that has been placed in the apparatus seen in FIG. 1. This coded series of pulses is transmitted to the receiver 24, the circuitry of which is seen in FIG. 3, by reason of the fact that the transister Q1, seen at the lower right in FIG. 2B has its output connected to LED 1 which is a source of infrared radiation; hence, it will be understood that a series of light pulses is generated by this LED.

The way in which the particular coded series of pulses is formed is as follows. Referring to the lefthand side of the schematic (FIG. 2A), a pair of functional blocks U1 and U2 are seen, the former being configured as a one-shot or monostable multivibrator. The other block U2 is configured as a 300 cycle oscillator. These two units or blocks are interconnected such that a defined series of pulses is produced.

Figure 4:
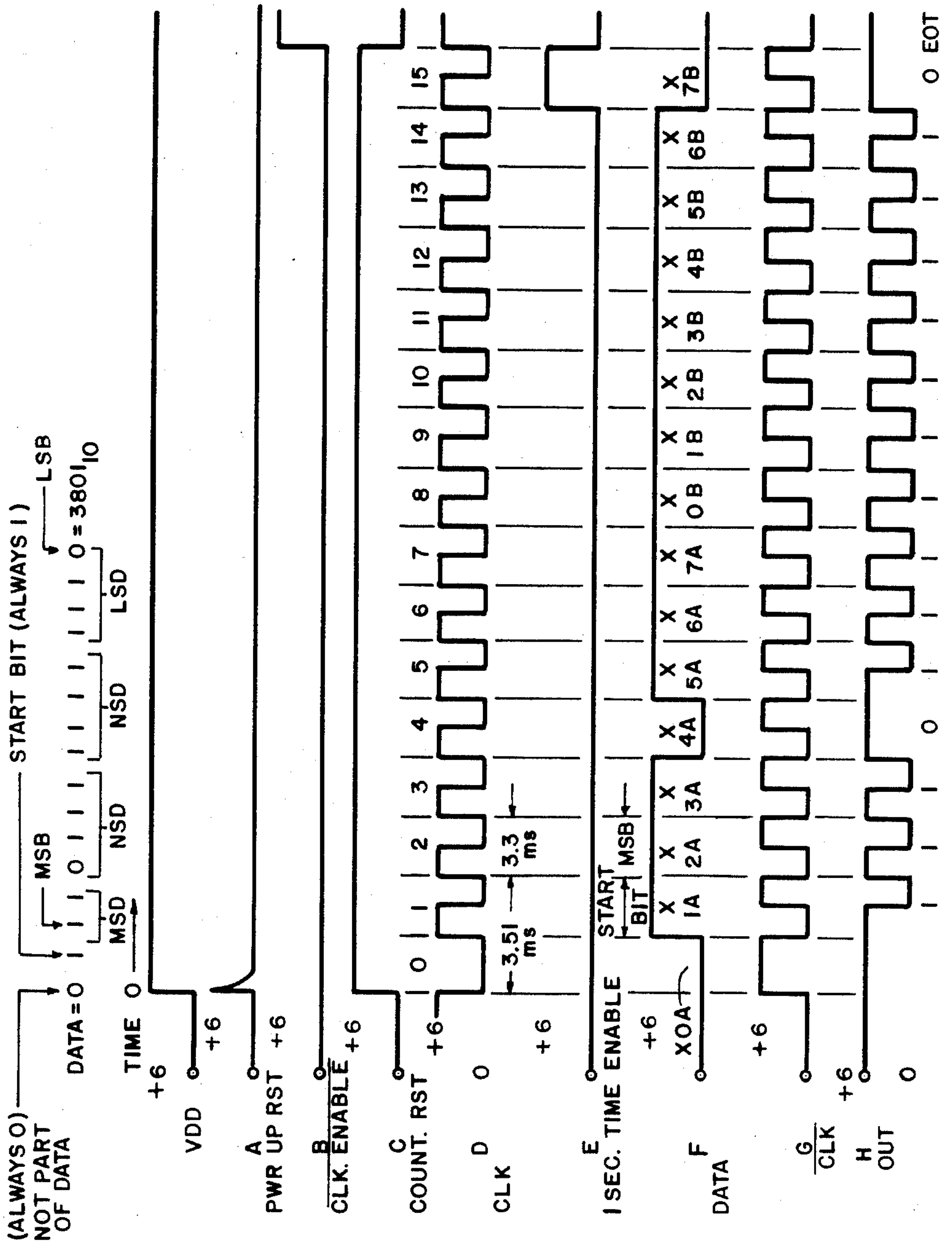
FIG. 4 is a timing diagram showing the pulse pattern found at different points or terminals in the system, such a diagram being helpful in explaining the operation of the system.

Block or unit U1 functions as a timer holding its companion block U2 off for a period of 950 milliseconds (see timing diagram, FIG. 4). Then block U2 turns on and generates a pulse stream or a series of pulses which is clocked into unit or block U3. U3 functions as a counter having a four bit binary output, an input clock causing the outputs Q0 through Q3 to count up in binary fashion.

It will be understood by those skilled in the art that U4 and U5 (FIG. 2B) are data selectors which have their inputs A0, A1 and A2 of each unit connected to the respective outputs Q0–Q2 of U3. Additionally, the output Q3 of U3 is connected to the Dis terminal of U4 and, by way of the inverter U6, to the Dis terminal of U5. The outputs Q0 through Q2 are address inputs to terminals A0 through A2 of each of the data selectors U4 and U5. These address inputs selectively address the inputs X0 through X7 of U4.

The result is an output from U4 on its terminal Z which, in turn, is seen connected to the input of NAND gate 30. Another input of this NAND gate is connected to an inverter U6 which has its input (pin 2) connected to the input of U3.

Connected at the output of the NAND gate 30 is an additional inverter designated U6 having its output connected to the output transistor Q1.

It should be noted, before the description of the circuitry of the present invention proceeds, that the symbol of a line segment with a black dot, shown connected to the components to be described, designates a nominal +6 volt DC power bus. Also, the several hexagonal terminal symbols A,B,C etc. represent terminals at which particular patterns of pulses (as depicted in the timing diagram of FIG. 4) occur as the various components translate and modify the orignally generated series of pulses.

From the output of transistor Q1 connection is made by suitable connector 80 to an additional circuit board 40, it being understood that the main circuit already described has its own circuit board 42 on which that main circuit is implemented and laid out. Connected by way of connector 80 to the main circuit board 42 is the LED 1, which as noted previously is the source of infrared radiation to be coupled to the trasmitter to be described.

It should be especially noted that the transmitter includes a means for selectively coding the series of pulses; that is, to uniquely identify each of the particular cash boxes that are being utilized at given instances. It will be seen that this means or arrangement for selectively coding includes a plurality of plug receiving sockets JA1, JA2, JA3 and JA4, the first pair being associated with U4 and the second, as will be evident, with U5. The plugs or "shunts" that are received accomplish the selection, as will be apparent from the timing diagram of FIG. 4, of a particular unique coded series of pulses for identifying a given cash box.

The plugs or shunts referred to above are standard or conventional devices such as those manufactured by the AMP Corporation, such devices including a series of straps that can be broken, or left unbroken, depending on the code to be selected. Such plugs or shunts can be purchased in the pre-programmed state, as specifically ordered by the customer, or they can be programmed after delivery by the customers breaking of the appropriate straps in the device to select the desired code. Each of the sockets such as JA1, JA2, JA3 and JA4, is given a particular decimal weight such as 1000 for JA1, 100 for JA2, 10 for JA3 and 1 for JA4, whereby it will be appreciated that a particular number is then selected for the given cash box such as the number depicted in FIG. 4, namely 3801. In this instance, the particular plug for the JA1 socket is selected to have the decimal value 3, the plug for JA2 to have the value 8; the plug for JA3 to have the value 0; and the plug for JA4 to have the value 1.

It will be apparent to those skilled in the art that any other suitable selections, involving different decimal values, can be made so as uniquely to identify a whole group of cash boxes.

It will be apparent that the description up to this point has been keyed to the particular data selector U4, but that, subsequently to the operation described for U4, the data selector U5 is selectively addressed, and it transmits the data from its X inputs, i.e. inputs X0B to X7B, to the corresponding output terminal Z of U5.

Referring now to FIG. 3 of the drawing, there will be seen a schematic layout of the receiver 24 of the system. At the input thereof, the coded series of light pulses transmitted from the LED 1 inpinge upon the phototransistor 22, these pulses being translated to electronic pulses which correspond substantially to the original series of pulses from the transmitter.

These input pulses are thereafter amplified in a cascaded arrangement of operational amplifier U7 and U8 and, at the output of the latter stage, these pulses are transmitted to a one-shot multivibrator U9, functioning as a timer in an integrated circuit configuration well known in the art. In U9, the series of pulses is suitably stretched, and at the output thereof, connection is made to connector block designated 90. From this connector lines 1, 2 & 4 are in turn connected to a standard or conventional microcomputer, which performs a variety of functions, but in this particular context is utilized to read and decode the received series of pulses and to store the information as to cash box number in appropriate memory. This stored information can be retrieved from memory and sent by a transmission link 100, shown schematically in FIG. 3, to a central location having a main frame computer or the like.

Figure 5:
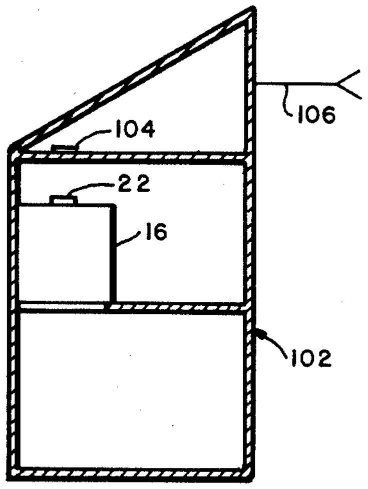
FIG. 5 is a schematic diagram illustrating vault for collecting revenue from cash boxes, the vault including a receiver for identifying such boxes.

Referring now to FIG. 5, it will be understood that an authorized location includes a vault 102, at which revenue collection is carried out from a variety of cash boxes, each cash box being identified in its turn by the system of the present invention, which includes a receiver 104 installed in vault 102. Verification of the amount of revenue already collected from fare boxes by the individual cash boxes is made by a further transmission link 106 to the main frame computer.

In order to provide the man skilled in the art with a detailed set of component values and types such that the exemplary embodiment already described can be readily constructed, it should first be noted that resistance and capacitor values have been indicated on the drawings. In particular, capacitor values are in microfarads unless otherwise noted. The types of principal active components are herewith listed in a table showing function, symbol used in the drawing for the component, and the manufacturer's type;

| FUNCTION | SYMBOL | TYPE |
|---|---|---|
| | TRANSMITTER | |
| Timing | U1, U2 | CD 4047 BE |
| Counter | U3 | CD 40161 BE |
| Data Selectors | U4, U5 | CD 4512 BE |
| Inverter/NAND | U6 | CD 4011 BE |
| FET Driver | Q1 | IRFD-1Z3 |
| Light Emission | LED1 | OP 297A |
| | RECEIVER | |
| Photo Transistor | Q2 | OP 598 A |
| OP Amplifiers | U7, U8 | CA 3130 |
| Timing | U9 | XR-L555 |

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

I claim:

1. An identification system for guaranteeing that a cash box adapted to receive money from an associated fare box is delivered to an authorized location comprising:

a fare box and apparatus on which said fare box is mounted;

a cash box and a compartment in said apparatus for receiving said cash box so as to place it in proximity to said fare box for receiving money from the fare box;

a transmitter included as part of said cash box for generating and transmitting a coded series of electronic pulses uniquely identifying said cash box;

a first receiver included as part of said fare box for receiving said coded series of pulses;

a microcomputer connected to the output of said receiver for reading and decoding said coded series of pulses to yield the identification number for said cash box, and for storing said number in memory;

means for transmitting said identification number to a central station computer;

further comprising a vault at said authorized location where said money is collected from a multiplicity of cash boxes;

a second receiver built into said vault for receiving said coded series of pulses, thereby to enable checking on proper delivery of cash boxes to said authorized location, including means for transmitting said received and coded series of pulses to said central computer so as to verify that a particular identified cash box has been delivered to said vault.

2. A system as defined in claim 1, further including means for selectively varying said coded series of pulses so as uniquely to identify a particular cash box.

3. A system as defined in claim 2 in which said transmitter includes a counter; a clock source of pulses, and a plurality of integrated circuit logic devices connected to said clock source and to each other so as to generate a selected coded series of pulses, and in which said means for selectively varying said series of pulses includes strapping means at the inputs of said logic devices to uniquely generate the selected coded series of pulses.

4. A system as defined in claim 3, further including a common output from said logic devices, said common output being connected to an input of a NAND circuit, another input of said NAND circuit being connected by way of a further NAND circuit to the input said counter, whereby the coding of the series of pulses is effectuated.

5. A system as defined in claim 4, in which a field effect transistor is connected at the output of said transmitter and a light emitting diode, which emits light in the infra red, is connected to the output of said transistor, thereby to provide a coded series of infra light pulses corresponding to said coded series of electronic pulses.

6. A system as defined in claim 5, in which said receiver includes a phototransistor at its input for receiving said coded series of light pulses and for translating them to a corresponding series of electronic pulses; and further including a pair of operational amplifiers and a one-shot multivibrator all connected in a cascade arrangement, for providing the data output to said microcomputer.

* * * * *